United States Patent [19]
Gay et al.

[11] Patent Number: 5,663,222
[45] Date of Patent: Sep. 2, 1997

[54] PIPERIDYL ORGANOSILOXANES AND POLYMER SUBSTRATES LIGHT-STABILIZED THEREWITH

[75] Inventors: Michel Gay, Villeurbanne; Sylvie Lavault, Lyons, both of France

[73] Assignee: Rhone-Poulenc Chimie, Courbevoie Cedex, France

[21] Appl. No.: 475,980

[22] Filed: Jun. 7, 1995

Related U.S. Application Data

[62] Division of Ser. No. 908,860, Jul. 1, 1992, which is a continuation of Ser. No. 475,279, Feb. 5, 1990, abandoned.

[30] Foreign Application Priority Data

Feb. 3, 1989 [FR] France ................... 89 01653

[51] Int. Cl.$^6$ ................... C08K 5/34
[52] U.S. Cl. ............... 524/99; 524/102; 524/103; 524/788
[58] Field of Search ............... 524/99, 102, 103, 524/788

[56] References Cited

FOREIGN PATENT DOCUMENTS

A-32719/89  4/1989  Australia.

*Primary Examiner*—Karen A. Dean
*Attorney, Agent, or Firm*—Burns, Doane, Swecker & Mathis, L.L.P.

[57] ABSTRACT

Novel piperidyl organosiloxanes, well adapted for the light/UV-stabilization of a wide variety of polymer substrates, e.g., polyolefins and polyalkadienes, have the structural formula (I):

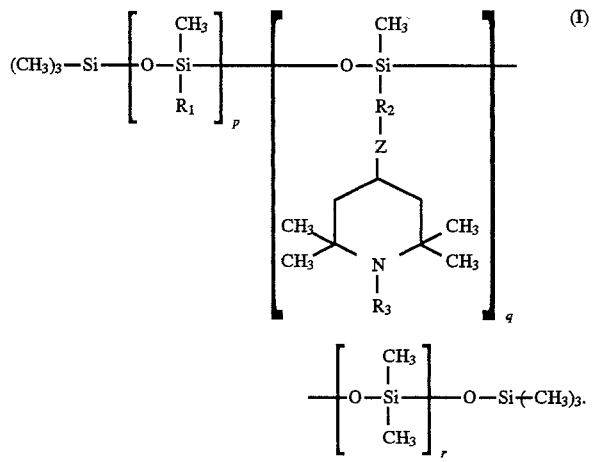

9 Claims, No Drawings

PIPERIDYL ORGANOSILOXANES AND POLYMER SUBSTRATES LIGHT-STABILIZED THEREWITH

This application is a division of application Ser. No. 07/908,860, filed Jul. 1, 1992, which is a continuation of application Ser. No. 07/475,279 filed Feb. 5, 1990, now abandoned.

BACKGROUND OF THE INVENTION

1. Field of the Invention

The present invention relates to novel compounds comprising piperidyl functional groups bonded to a siloxane backbone, and to the use of such novel compounds for the light stabilization of polymer substrates.

2. Description of the Prior Art

It is known to this art that organic polymers and more particularly polyolefins and polyalkadienes are degraded when they are subjected to extraneous agents, especially the combined action of air and ultraviolet radiation in sunlight.

Such degradation is typically restricted by introducing small amounts of stabilizers into the polymer.

At present, some of the most effective of these anti-UV stabilizers are the sterically hindered amines, in particular 2,2,6,6-tetramethylpiperidines.

In practice, however, one of the major problems in the use of these anti-UV stabilizers is to provide a good compromise between their effectiveness, which implies mobility within the polymer and the persistence of their activity, which implies the use of molecules of high molecular weight, which do not exude.

It is for this reason that it has been proposed to use polyalkylpiperidines of high molecular weight, in order to limit the losses thereof, especially if the polymers are intended for use at high temperature. Thus, U.S. Pat. No. 4,698,381 describes a great number of high molecular weight or polymeric tetramethylpiperidines; it also describes N,N',N''-tris-(2,2,6,6-tetramethylpiperidyl-triazinyl)-undecanetriamines having molecular weights above about 1,500.

Published European Patent Application No. 0,162,524 proposes another solution, i.e., the use of compounds which contain, per molecule thereof, sterically hindered amine groups and hydrolyzable silyl groups.

Nonetheless, these latter compounds can result in the formation of complex resinous structures by reaction in the polymer or over the course of time.

Such compounds appear to have an effective stabilizing action according to the examples in EP-A 0,162,524, but they also present certain disadvantages.

Thus, crosslinking results in the formation of an alcohol from the hydrolyzable groups, which thus modifies the complex polymeric formulations in which all of the constituents serve a particular function.

Moreover, the presence of the hydrolyzable groups in these compounds makes it difficult to preserve them.

Finally, the formation of a complex resin structure limits the mobility of the stabilizing structure in the polymer.

SUMMARY OF THE INVENTION

Accordingly, a major object of the present invention is the provision of novel polymer stabilizers which conspicuously ameliorate those disadvantages and drawbacks to date characterizing the state of this art.

Briefly, the present invention features the novel compounds of the general formula (I):

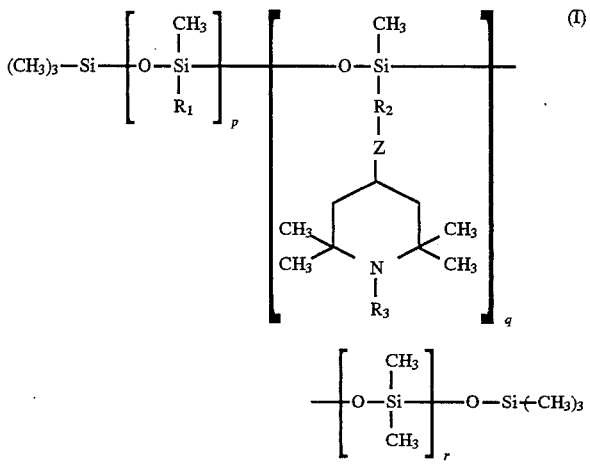

in which the various recurring units are randomly distributed along the molecular backbone; p and r are numbers equal to or greater than 0; q is a number greater than 0; the sum of p+r+q is greater than or equal to 5; $R_1$ is a linear or branched chain alkyl radical having more than 4 carbon atoms; a radical of the formula $-(CH_2)_n-COO-R_4$ in which n is a number ranging from 5 to 20 and $R_4$ is an alkyl radical having from 1 to 12 carbon atoms; or a radical of the formula $-(CH_2)_m-OR_5$ in which m is a number ranging from 3 to 10 and $R_5$ is a hydrogen atom, an ethylene oxide chain, a propylene oxide chain or an acyl radical having from 2 to 12 carbon atoms; $R_2$ is a divalent organic radical selected from among a linear or branched chain alkylene radical having from 2 to 18 carbon atoms; an alkylene-carbonyl radical, the linear or branched chain alkylene moiety of which contains from 2 to 20 carbon atoms; an alkylene-cyclohexylene radical, the linear or branched chain alkylene moiety of which contains from 2 to 12 carbon atoms and the cyclohexylene moiety contains an —OH grouping and optionally 1 or 2 alkyl radicals having from 1 to 4 carbon atoms; a radical of the formula $-R_6-O-R_7-$ in which the radicals $R_6$ and $R_7$, which may be identical or different, are each an alkylene radical having from 1 to 12 carbon atoms; a radical of the formula $-R_6-O-R_7-$ in which $R_6$ and $R_7$ are as defined above and either or both are substituted by one or two OH groups; a radical of the formulae $-R_6-COO-R_7-$ or $-R_6-OCO-R_7-$ in which $R_6$ and $R_7$ are as defined above, or a radical of the formula $-R_6-O-R_7-O-CO-R_8-$ in which $R_6$, $R_7$ and $R_8$, which may be identical or different, are each an alkylene radical having from 2 to 12 carbon atoms and the radical $R_7$ is substituted by a hydroxyl group; $R_3$ is a hydrogen atom or a linear or branched chain alkyl radical having from 1 to 12 carbon atoms; and Z is —O— or —$NR_8$—, wherein $R_8$ has the definition of $R_3$.

DETAILED DESCRIPTION OF THE PREFERRED EMBODIMENTS OF THE INVENTION

More particularly according to the present invention, the novel compounds of formula (I) are advantageously those in which p is a number ranging from 0 to 100; r is a number ranging from 0 to 100; q is a number ranging from 3 to 100; the sum of p and r is greater than 0; the sum of p, q and r is greater than or equal to 10; $R_1$ is a linear or branched chain alkyl radical having from 5 to 18 carbon atoms; a radical of the formula —(CH$_2$)$_{10}$—COO—R$_4$ in which R$_4$ is an alkyl radical having from 1 to 6 carbon atoms; or a radical of the formula —(CH$_2$)$_3$-OR$_5$ in which R$_5$ is a hydrogen atom, an ethylene oxide chain, a propylene oxide chain or an acyl group having from 2 to 6 carbon atoms; R$_2$ is a divalent hydrocarbon radical selected from among a linear or branched chain alkylene radical having from 3 to 12 carbon atoms; an alkylene-carbonyl radical, the linear or branched chain alkylene moiety of which contains from 2 to 12 carbon atoms; an alkylene-cyclohexylene radical, the linear or branched chain alkylene moiety of which contains from 2 to 6 carbon atoms and the cyclohexylene moiety contains an —OH group and optionally 1 or 2 alkyl substituents having from 1 to 4 carbon atoms; a radical of the formula —R$_6$—O—R$_7$— in which the radicals R$_6$ and R$_7$, which may be identical or different, are each an alkylene radical having from 2 to 6 carbon atoms; a radical of the formula —R$_6$—O—R$_7$— in which R$_6$ and R$_7$ are as defined above and R$_7$ is substituted by an OH group; a radical of the formulae —R$_6$—COO—R$_7$— and —R$_6$—OCO—R$_7$— in which R$_6$ and R$_7$ are as defined above; a radical of the formula —R$_6$—O—R$_7$—O—CO—R$_8$— in which R$_6$, R$_7$ and R$_8$, which may be identical or different, are each an alkylene radical having from 2 to 6 carbon atoms and the radical R$_7$ is substituted by a hydroxyl group; R$_3$ is a hydrogen atom or a linear or branched chain alkyl radical having from 1 to 6 carbon atoms; and Z is —O— or —NR$_8$— in which R$_8$ is a hydrogen atom or an alkyl radical having from 1 to 6 carbon atoms.

Preferably, the compounds of the invention are those of the formula (I) in which p is a number ranging from 5 to 55; r is a number ranging from 0 to 40; q is a number ranging from 5 to 70; the sum of p, q and r is a number ranging from 10 to 100; R$_1$ is a linear or branched chain alkyl radical having from 5 to 18 carbon atoms; a radical of the formula —(CH$_2$)$_{10}$—COO—R$_4$ in which R$_4$ is an alkyl radical having from 1 to 6 carbon atoms; a radical of the formula —(CH$_2$)$_3$—OR$_5$ in which R$_5$ is a hydrogen atom, an ethylene oxide chain, a propylene oxide chain or an acyl group having from 2 to 6 carbon atoms; R$_2$ is a hydrocarbon radical selected from among a linear or branched chain alkylene radical having from 3 to 12 carbon atoms; the radical —(CH$_2$)$_{10}$—CO—; an alkylene-cyclohexylene radical, the linear or branched chain alkylene moiety of which contains from 2 to 6 carbon atoms and the cyclohexylene moiety contains an —OH group and optionally 1 or 2 alkyl substituents having from 1 to 4 carbon atoms; a radical of the formula —R$_6$—O—R$_7$— in which the radicals R$_6$ and R$_7$, which may be identical or different, are each an alkylene radical having from 2 to 6 carbon atoms; a radical of the formula —R$_6$—O—R$_7$— in which R$_6$ and R$_7$ are as defined above and R$_7$ is substituted by an OH group; a radical of the formulae —R$_6$—COO—R$_7$— and —R$_6$—OCO—R$_7$— in which R$_6$ and R$_7$ are as defined above, or a radical of the formula —R$_6$—O—R$_7$—O—CO—R$_8$— in which R$_6$, R$_7$ and R$_8$, which may be identical or different, are each an alkylene radical having from 2 to 6 carbon atoms and the radical R$_7$ is substituted by a hydroxyl group; R$_3$ is a hydrogen atom or a linear or branched chain alkyl radical having from 1 to 6 carbon atoms; and Z is —O— or —NR$_8$— in which R$_8$ is a hydrogen atom or an alkyl radical having from 1 to 6 carbon atoms.

More preferred compounds of the formula (I) are those in which p is a number ranging from 5 to 30; r is a number ranging from 0 to 40; q is a number ranging from 5 to 70; the sum of p, q and r is a number ranging from 10 to 100; R$_1$ is a linear or branched octyl radical; a methyl or ethyl decamethylene-carboxylate radical; a dodecyl radical; or an octadecyl radical; R$_2$ is a trimethylene radical; a decamethylene-carbonyl radical; a 2-hydroxy-4-oxa-heptamethylene radical; a 6-hydroxy-4,8-dioxa-3-oxo-undecamethylene radical; or a 4-(1-methylethylene)-2-hydroxy-1-ethylcyclohexyl radical; R$_3$ is a hydrogen atom or a methyl radical; and Z is —O— or NH or NCH$_3$.

The compounds according to the invention can be prepared from an organosiloxane compound of the general formula (II):

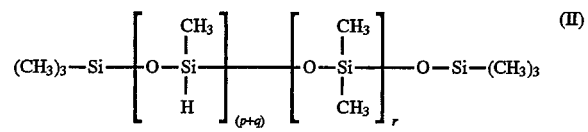

in which p, q and r are as defined above for the compounds of the formula (I).

Such compounds of formula (II) are readily commercially available.

The replacement of the hydrogen atoms of the compound (II) by the radical of the formula (III):

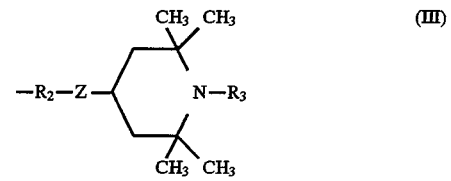

and optionally by the radical R$_1$ is carried out by reacting the organosiloxane (II) with a compound having an ethylenic double bond susceptible to a hydrosilylation reaction in the presence of a platinum catalyst.

This compound will thus be the unsaturated precursor of the radical (III) or of the radical R$_1$.

Specific non-limiting examples of R$_1$ precursors include 1-octene, methyl undecenoate, 1-dodecene and 1-octadecene.

Specific non-limiting examples of precursors of the radical of formula (III) are 4-allyloxy-2,2,6,6-tetramethyl-piperidine, 4-allyloxy-1,2,2,6,6-pentamethylpiperidine and 2,2,6,6-tetramethyl-4-piperidyl undecenoate.

It is also possible to form the units:

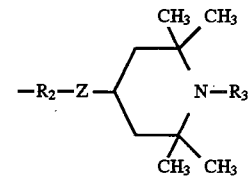

by reacting a precursor of the radical R$_2$, containing an ethylenic double bond, via hydrosilylation on the ≡Si—H moiety, and then carrying out a second reaction on this precursor of R$_2$ for introducing the 2,2,6,6-tetramethyl-4-piperidyl radical thereon.

This is especially the case when Z is —NR$_8$, by using as the R$_2$ precursor a compound containing an ethylenic double bond and epoxide group, such as 3-allyloxy-1,2-epoxy-propane or 1,2-epoxy-4-isopropenyl-1-methylcyclohexane.

The hydrosilylation reaction between the ≡Si—H groups of the organosiloxane compound (II) and the precursor compounds of the radicals R$_1$ and R$_2$ can be carried out simultaneously by adjusting the molar ratios of the various reagents, as a function of the desired numbers p and q. This reaction, per se known to the art, is carried out in the presence of a platinum catalyst.

The reaction between the precursor of $R_2$ with an epoxide function and 4-amino-2,2,6,6-tetramethylpiperidine or 4-alkylamino-2,2,6,6-tetramethylpiperidine:

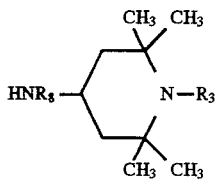

in carried out by simple heating to a temperature of about 80° to 140° C. for a few minutes to up to several hours.

The radical $R_2$ can also be developed in several stages; thus, for example, a hydrosilylation reaction between the ≡Si—H function of the organosiloxane compound of the formula (II) and an unsaturated alcohol such as allyl alcohol can be carried out first.. The alcohol function of the hydroxyalkyl radical (for example 3-hydroxypropyl) thus grafted onto the Si atom is then reacted with an unsaturated carboxylic acid or preferably one of the alkyl esters thereof, for example the methyl ester, such as acrylic acid or methacrylic acid. Finally, the double bond of the unsaturated acid can react with the derivative of the formula (IV) of 2,2,6,6-tetramethylpiperidine (MICHAEL addition).

These different routes for the synthesis of the various compounds (I) of the invention are not limiting.

The compounds of the formula (I) can be used as UV stabilizers in organic polymers.

Exemplary of such organic polymers are the polyolefins, polyalkadienes, polystyrenes, polyurethanes, polyamides, polyesters, polycarbonates, polysulfones, polyethersulfones, polyether-ketones, acrylic polymers, as well as the copolymers and mixtures thereof.

Among these polymers, the compounds of the invention are more particularly effective in admixture with the polyolefins and polyalkadienes, such as polypropylene, high-density polyethylene, linear low-density polyethylene, low-density polyethylene, polybutadiene, as well as the copolymers and mixtures thereof.

Among the compounds of the formula (I), those in which the symbol p is a number greater than 0 are of particular interest since, aside from their stabilizing activity, the presence of the $R_1$ groups, in particular alkyl radicals having more than 4 carbon atoms, confers greater compatibility with the polymers to be stabilized.

In light of the wide range of possible variations of the relative numbers p, q and r of the different recurring units present in the siloxane chain of the compounds of the formula (I), such compounds can readily be adapted to solve different problems.

Moreover, as compared with certain compounds of the prior art, such as those described in EP-A 0,162,524, they do not change because their chains are said to be blocked ($(CH_3)_3$—Si— endgroups). In this manner, the length of the chains and consequently the viscosity of the compounds and their effectiveness are controlled.

The present invention, therefore, also features organic polymer compositions stabilized against the detrimental effects of light and UV by an effective stabilizing amount of at least one compound of the formula (I).

Typically, these compositions contain 0.04 to 20 milliequivalents of 2,2,6,6-tetramethylpiperidyl functional groups per 100 g of polymer.

Preferably, the polymeric compositions stabilized according to the invention contain 0.20 to 4 milliequivalents of 2,2,6,6-tetramethylpiperidyl functional groups per 100 g of polymer.

For example, the stabilized polymeric compositions generally contain 0.01% to 5% by weight of a compound of the formula (I) relative to the weight of the polymer.

The compounds of formula (I) can be added either during or subsequent to the preparation of the polymers.

In addition, the subject compositions can contain all of the additives and stabilizers conventionally used with the polymers contained therein.

Thus, the following stabilizers and additives can be incorporated:

1. Antioxidants 1.1. Alkylated monophenols, such as: 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-isobutylphenol, 2,6-di-cyclopentyl-4-methylphenol, 2-(α-methyl-cyclohexyl)-4,6-dimethylphenol, 2,6-dioctadecyl-4-methylphenol, 2,4,6-tricyclohexylphenol, 2,6-di-tert.-butyl-4-methoxymethylphenol and 2,6-dinonyl-4-methylphenol;

1.2. Alkylated hydroquinones, such as: 2,6-di-tert.-butyl-4-methoxyphenol, 2,5-di-tert.-butyl-hydroquinone, 2,5-di-tert.-pentyl-hydroquinone and 2,6-diphenyl-4-octadecyloxyphenol;

1.3. Hydroxylated diphenyl sulfides, such as: thio-2,2'-bis-(6-tert.-butyl-4-methylphenol), thio-2,2'-bis-(4-octylphenol), thio-4,4'-bis-(6-tert.-butyl-3-methylphenol) and thio-4,4'-bis-(6-tert.-butyl-2-methylphenol);

1.4. Alkylidene-bisphenols, such as: 2,2'-methylene-bis-(6-tert.-butyl-4-methylphenol), 2,2'-methylene-bis-(6-tert.-butyl-4-ethylphenol), 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol),2,2'-methylene-bis-(4,6-di-tert.-butylphenol), 2,2'-ethylidene-bis-(4,6-di-tert.-butylphenol), 2,2'-ethylidene-bis-(6-tert.-butyl-4-isobutylphenol), 2,2'-methylene-bis-[6-(α-methylbenzyl)-4-nonylphenol], 2,2-methylene-bis-[6-(α,α-dimethylbenzyl)-4-nonylphenol], 4,4'-methylene-bis-(2,6-di-tert.-butylphenol), 4,4'-methylene-bis-(6-tert.-butyl-2-methylphenol), 1,1-bis-(5-tert.-butyl-4 -hydroxy-2-methylphenyl)butane, 2,6-bis-(3-tert.-butyl-5-methyl-2-hydroxybenzyl)-4-methylphenol, 1,1,3-tris-(5-tert.-butyl-4-hydroxy-2-methylphenyl)-butane, 1,1-bis-(5-tert.-butyl-4-hydroxy-2-methylphenyl)-3-n-dodecylthiobutane, ethylene glycol bis-[(3,3-bis-3-tert.-butyl-4-hydroxyphenyl)-butyrate], bis-(3-tert.-butyl,4-hydroxy-5-methylphenyl)-dicyclopentadiene and bis-[2-(3-tert.-butyl-2-hydroxy-5-methylbenzyl)-6-tert.-butyl-4-methylphenyl) terephthalate;

1.5. Benzyl compounds, such as: 1,3,5-tris-(3,5-di-tert.-butyl-4-hydroxybenzyl)-2,4,6-trimethylbenzene, bis-(3,5-di-tert.-butyl-4-hydroxybenzyl)sulfide, isooctyl (3,5-di-tert.-butyl-4-hydroxybenzylthio)-acetate, bis-(4-tert.-butyl-3-hydroxy-2,6-dimethylbenzyl) dithioterephthalate, tris-(3,5-di-tert.-butyl-4-hydroxybenzyl) isocyanurate, tris-(4-tert.-butyl-3-hydroxy-2,6-dimethylbenzyl) isocyanurate, dioctadecyl (3,5-di-tert.-butyl-4-hydroxybenzyl)-phosphonate, the calcium salt of monoethyl (3,5-di-tert.-butyl-4-hydroxy-benzyl)-phosphonate and tris-(3,5-dicyclohexyl-4-hydroxy-benzyl) isocyanurate;

1.6. Acylaminophenols, such as 4-lauroylaminophenol, 4-stearoylaminophenol, 2,4-bis-octylthio-6-(3,5-di-tert.-butyl-4-hydroxyanilino)-1,3,5-triazine and octyl N-(3,5-di-tert.-butyl-4-hydroxyphenyl)-carbamate;

1.7. Esters of 3-(3,5-di-tert.-butyl-4-hydroxy-phenyl)-propionic acid derived from monoalcohols or polyols, such alcohols including: methanol, octadecanol, 1,6-hexanediol, neopentylglycol, thio-diethylene glycol, diethylene glycol, triethylene glycol, pentaerythritol, tris-(hydroxyethyl) isocyanurate and N,N'-bis-(hydroxyethyl)-oxamide;

1.8. Esters of 3-(5-tert.-butyl-4-hydroxy-3-methylphenyl)-propionic acid derived from monoalcohols or polyols, such alcohols including: methanol, octadecanol, 1,6-hexanediol, neopentylglycol, thio-diethylene glycol, diethylene glycol, triethylene glycol, pentaerythritol, tris-(hydroxyethyl) isocyanurate and N,N'-bis-(hydroxy-ethyl)-oxamide;

1.9. Esters of 3-(3,5-dicyclohexyl-4-hydroxyphenol)-propionic acid derived from monoalcohols or polyols, such alcohols including: methanol, octadecanol, 1,6-hexanediol, neopentylglycol, thio-diethylene glycol, diethylene glycol, triethylene glycol, pentaerythritol, tris-(hydroxyethyl) isocyanurate and N,N'-bis(hydroxyethyl)-oxamide;

1.10. Amides of 3-(3,5-di-tert.-butyl-4-hydroxyphenyl)-propionic acid such as: N,N'-bis-(3,5-di-tert.-butyl-4-hydroxyphenylpropionyl)-hexamethylenediamine, N,N'-bis-(3,5-di-tert.-butyl-4-hydroxyphenylpropionyl)-trimethylenediamine and N,N'-bis-(3,5-di-tert.-butyl-4-hydroxyphenylpropionyl)-hydrazine.

2. Ultraviolet radiation absorbers and light stabilizers:

2.1. 2-(2'-Hydroxyphenyl)-benzotriazoles, for example the 5'-methyl, 3',5'-di-tert.-butyl, 5'-tert.-butyl, 5'-(1,1,3,3-tetramethylbutyl), 5-chloro-3',5'-di-tert.-butyl, 5-chloro-3'-tert.-butyl-5'-methyl, 3'-sec.-butyl-5'-tert.-butyl, 4'-octyloxy-3',5'-di-tert.-pentyl and 3',5'-bis-(α,α-dimethylbenzyl) derivatives;

2.2. 2-Hydroxybenzophenones, such as the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives;

2.3. Esters of substituted and unsubstituted benzoic acids, such as: 4-tert.-butylphenyl salicylate, phenyl salicylate, octylphenyl salicylate, dibenzoylresorcinol, bis-(4-tert.-butylbenzoyl)-resorcinol, benzoylresorcinol, 2,4-di-tert.-butylphenyl, 3,5-di-tert.-butyl-4-hydroxybenzoate and hexadecyl 3,5-di-tert.-butyl-4-hydroxybenzoate;

2.4. Acrylates, such as: ethyl or isooctyl α-cyano-β,β-diphenylacrylate, methyl α-methoxycarbonylcinnamate, methyl or butyl α-cyano-β-methyl-p-methoxy-cinnamate, methyl α-methoxycarbonyl-p-methoxycinnamate and N-(β-methoxycarbonyl-β-cyanovinyl)-2-methylindoline;

2.5. Nickel compounds, such as: nickel complexes derived from 2,2'-thio-bis-[4-(1,1,3,3-tetramethylbutyl)-phenol], for example the 1:1 complex or 1:2 complex, optionally with other ligands such as n-butylamine, triethanolamine or N-cyclohexyldiethanolamine, nickel dibutyldithiocarbamate, nickel salts of monoalkyl (4-hydroxy-3,5-di-tert.-butylbenzyl)-phosphonates, such as the methyl and ethyl esters, nickel complexes, derived from ketoximes, such as the nickel complex derived from the oxime of 1-dodecanoyl-2-hydroxy-4-methylbenzene and nickel complexes of 1-phenyl-4-1auroyl-5-hydroxypyrazole, optionally with other ligands;

2.6. Oxamides, such as: 4,4'-bis-octyloxyoxanilide, 2,2'-bis-octyloxy-5,5'-tert.-butyl-oxanilide, 2,2'-bis-dodecyloxy-5,5'-di-tert.-butyl-oxanilide, 2-ethoxy-2'-ethyl-oxanilide, N,N'-bis-(3-dimethylaminopropyl)-oxamide, 2-ethoxy-5-tert.-butyl-2'-ethyloxanilide, mixtures of the latter with 2-ethoxy-2'-ethyl-5,4'-di-tert.-butyloxanilide and mixtures of 2,2'- and 4,4'-dimethoxyoxanilide as well as 2,2'- and 4,4'-diethoxyoxanilide.

3. Metal deactivators, such as: N,N'-diphenyloxamide, N-salicylidene-N'-salicyloylhydrazine, N,N'-bis-salicyloylhydrazine, N,N'-bis-(3,5-di-tert.-butyl-4-hydroxyphenylpropionyl)-hydrazine, 3-salicyloylamino-1,2,4-triazole and the bis-(benzylidene-hydrazide) of oxalic acid.

4. Phosphites and phosphonites such as: triphenyl phosphite, diphenyl alkyl phosphites, dialkyl phenyl phosphites, tris-(nonylphenyl) phosphite, trilauryl phosphite, trioctadecyl phosphite, 3,9-bis-stearyloxy-2,4,8,10-tetraoxa-3,9-diphosphaspiro[5.5]-undecane, tris-(2,4-di-tert.-butylphenyl) phosphite, 3,9-bis-isodecyloxy-2,4,8,10-tetraoxa-3,9-diphosphaspiro[5.5]undecane, 3,9-bis-(2,4-di-tert.-butylphenoxy)-2,4,8,10-tetraoxa-3,9-diphosphaspiro[5.5]undecane, tristearyl sorbitol triphosphite and tetrakis-(2,4-di-tert.-butylphenyl) 4,4-biphenylylenediphosphonite.

5. peroxide scavengers, such as: esters of β-thiodipropionic acid, such as the lauryl, stearyl, myristyl and tridecyl esters, the zinc salt of 2-mercaptobenzimidazole, zinc dibutyl-dithiocarbamate, dioctadecyl disulfide and pentaerythritol tetrakis-(3-dodecylthio-propionate).

6. Polyamide stabilizers, such as: copper salts in combination with iodides and/or phosphorus compounds, and salts of divalent manganese.

7. Basic co-stabilizers, such as: melamine, polyvinylpyrrolidone, cyanoguanidine, triallyl cyanurate, urea derivatives, hydrazine derivatives, amines, polyamides, polyurethanes, alkali metal salts and alkaline earth metal salts of higher fatty acids, such as calcium stearate, zinc stearate, magnesium stearate, sodium ricinoleate or potassium palmitate, antimony pyrocatecholate and tin pyrocatecholate.

8. Nucleating agents, such as: 4-tert.-butylbenzoic acid, adipic acid and diphenylacetic acid.

9. Fillers and reinforcing agents, such as: calcium carbonate, silicates, glass fibers, asbestos, talc; kaolin, mica, barium sulfate, metal oxides and hydroxides, carbon black and graphite.

10. Other additives, such as, for example: plasticizers, lubricants, emulsifiers, pigments, optical brighteners, flameproofing agents, antistatic agents and blowing agents.

The polymer compositions thus stabilized can be used in the most diverse forms, for example in the form of moldings, films, fibers, cellular materials (foams), profiles or coating products, or as film-formers (binders) for paints, varnishes, glues or cements.

In order to further illustrate the present invention and the advantages thereof, the following specific examples are given, it being understood that same are intended only as illustrative and in nowise limitative.

EXAMPLE 1

Preparation of a compound of the formula (I), in which:

$p = 0$ $R_2 = -(CH_2)_3-$ $Z = -O-$ $R_3 = -CH_3$ (A) preparation of 1,2,2,6,6-pentamethyl-4-allyloxypiperidine:

85 g (0.5 mol) of 1,2,2,6,6-pentamethyl-4-hydroxypiperidine were dissolved in 200 cm³ of toluene.

The solution was heated to 100° C. and 11.5 g of sodium metal (0.5 mol).were gradually added under stirring over the course of 1 hour, 30 minutes.

The temperature of 100° C. and stirring were maintained for another 20 hours in such manner that virtually all the sodium reacted. A solution of 60.5 g (0.5 mol) of allyl bromide in 50 cm³ of toluene was then introduced over the course of 15 minutes (at 100° C.). The mixture was permitted to react for 3 hours and 30 minutes at the reflux temperature of the toluene, and 30 cm³ of ethanol were then added in order to eliminate any trace amounts of sodium metal.

The precipitate of sodium bromide was filtered off and washed with toluene. The toluene solution was concentrated by means of a rotary evaporator, thus giving 104.9 g of a crude organic mass. This crude product was washed with water in order to eliminate the unreacted 1,2,2,6,6-pentamethyl-4-hydroxypiperidine. The crude product was then purified by fractional distillation. This gave 68.5 g (65% yield) of pure 1,2,2,6,6-pentamethyl-4-allyloxypiperidine (boiling point at a pressure of 133 Pa: about 110° C.; structure confirmed by nuclear magnetic resonance).

(B) preparation of the compound of the formula (I):

4.22 g (19.95 mmol) of 1,2,2,6,6-pentamethyl-4-allyloxypiperidine prepared in (A), 25 cm³ of toluene and 4 µl of a hexane solution of a platinum catalyst (catalyst designated "KARSTED"), containing 5% by weight of Pt metal were charged to a 50 cm³ three-necked glass flask fitted with a central stirrer, a thermometer sheath, inlet means including a syringe piston and a condenser under nitrogen blanketing.

4.6 g of a hydrogenosiloxane oil having the formula (II):

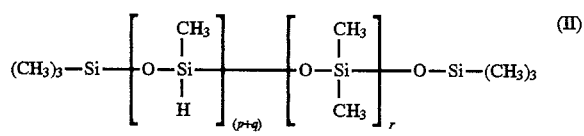

having the following average values:

$p+q=11.3$ $r=42$ and containing 290 milliequivalents of ≡Si—H function per 100 g (volumetric determination on a solution titrated with potassium hydroxide in butanol) were introduced over the course of 55 minutes into the above mixture maintained at 95° to 100° C.

The mixture was permitted to react at 95° C. while monitoring the disappearance of the ≡Si—H functions; this disappearance was complete after 23 hours of reaction.

The reaction mixture was then heated to 100° C. under a pressure of 67 Pa for 1 hour, in order to eliminate volatile products.

This gave 8 g of a clear, fairly mobile and light-yellow colored oil.

NMR analysis (nuclear magnetic resonance) confirmed the expected structure.

| Average statistical formula: |
|---|
| formula (I) with p = 0 |
| q = 11.3 |
| r = 42. |

EXAMPLE 2

Preparation of a compound of the formula (I), in which:

$p = 0$

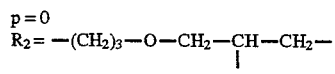

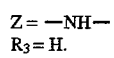

$Z = -NH-$ $R_3 = H.$ 12.2 g (78 mmol) of 4-amino-2,2,6,6-tetramethylpiperidine were charged to a 50 cm³ three-necked glass flask fitted with a central stirrer, a thermometer sheath, a dropping funnel and a condenser blanketed with nitrogen.

The flask was heated to 100° C. and, over the course of 25 minutes, under stirring and while maintaining the temperature at 100° to 105° C., 10 g of an organosiloxane oil of the formula (V):

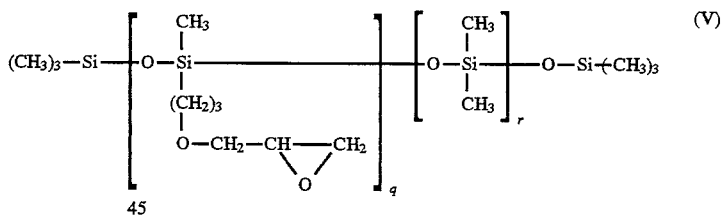

in which:

(i) the mean value of q was 9, (ii) the mean value of r was 7.5, and which on titration gave 391 milliequivalents of epoxide function per 100 g, were introduced.

This organosiloxane oil was prepared according to the procedure of Example 1 (A), by reaction between the ≡Si—H functions of the corresponding organosiloxane compound of the formula (II) and 3-allyloxy-1,2-epoxypropane.

After 3 hours of reaction at 100° C., all of the epoxide functions had reacted with the 4-amino-2,2,6-6-tetramethylpiperidine. The reaction mixture was heated to 130° to 140° C. under a pressure of 67 Pa in order to distill off the excess 4-amino-2,2,6,6-tetramethylpiperidine employed.

The compound obtained was very viscous and weighed 16.2 g.

IR and NMR analyses evidenced that the expected structure was present and that, in particular, only the primary amine function of the 4-amino-2,2,6,6-tetramethylpiperidine had reacted with the epoxide functions.

| Average statistical formula: |
| --- |
| formula (I) with p = 0 |
| q = 9 |
| r = 7.5. |

EXAMPLE 3

Preparation of a compound of the formula (I), in which:

| | |
| --- | --- |
| p = 30.8 | p = 8.9 |
| q = 22.3 | q = 54.5 |
| (B) r = 0 | (C) r = 0 |
| $R_2 = -(CH_2)_3-$ | $R_2 = -(CH_2)_3-$ |
| Z = —O— | Z = —O— |
| $R_3 = -CH_3$ | $R_3 = -CH_3$ |

(A) preparation of 1,2,2,6,6-pentamethyl-4-allyloxypiperidine:

28.75 g (1.25 mol) of sodium metal were introduced into 300 cm³ of toluene.

The reaction mass was heated to 100° to 105° C. and this temperature was then maintained in order to have a disperse suspension of sodium in the toluene.

213.75 g of 1,2,2,6,6-pentamethyl-4-hydroxypiperidine in solution in 100 cm³ of toluene were then added over the course of 1 hour, 15 minutes.

The temperature of 100° C. and stirring were maintained for an additional 20 hours in such manner that virtually all the sodium was reacted. A solution of 151.25 g (1.25 mol) of allyl bromide in 150 cm³ of toluene was then introduced over the course of 20 minutes (at 100° C.). The mixture was permitted to react for 3 hours at the reflux temperature of the toluene, and 75 cm³ of ethanol were then added in order to eliminate any trace amounts of sodium metal.

The precipitate of sodium bromide was filtered off and washed with toluene. The toluene solution was concentrated by means of a rotary evaporator, thus providing 262.25 g of a crude organic mass. This crude product was washed with water in order to eliminate the unreacted 1,2,2,6,6-pentamethyl-4-hydroxypiperidine. The crude product was then purified by fractional distillation. This gave 171.25 g (65% yield) of pure 1,2,2,6,6-pentamethyl-4-allyloxypiperidine (boiling point under a pressure of 133 Pa: about 110° C.; structure confirmed by nuclear magnetic resonance).

(B) preparation of the compound of the formula (I):

18.70 g (166.6 mmol) of 1-octene, 35.10 g (166.6 mmol) of 1,2,2,6,6-pentamethyl-4-allyloxypiperidine prepared in (A) and 6.1 µl of a hexane solution of a platinum catalyst (catalyst designated "KARSTED"), containing about 8.7% by weight of Pt metal, were charged to a 250 cm³ three-necked glass flask fitted with a central stirrer, a thermometer sheath, inlet means including a syringe piston and a condenser under nitrogen blanketing.

By means of the syringe piston, 13.80 g of a hydrogenosiloxane oil of the formula (II):

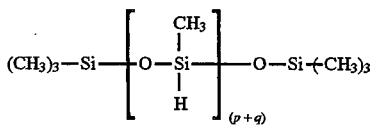

having a content of 1609.25 milliequivalents of ≡Si—H function per 100 g (volumetric determination on a solution titrated with potassium hydroxide in butanol) were injected over the course of 1 hour, 30 minutes into the above mixture maintained at 100° C.

An additional 1.2 µl of the "KARSTED" catalyst was injected and the mixture was permitted to react at 100° C. while monitoring the disappearance of the ≡Si—H functions; this disappearance was complete after 5 hours, 30 minutes of reaction.

The reaction mixture was then heated to 100° C. under a pressure of 266 Pa for 2 hours, 30 minutes, in order to eliminate volatile products.

This gave 56.6 g of a clear, highly mobile and light-yellow colored oil, whose content of piperidyl functional groups was 220 milliequivalents/100 g.

NMR analysis confirmed the expected structure.

| Average statistical formula: |
| --- |
| formula (I) with p = 30.8 |
| q = 22.3 |
| r = 0. |

(C) preparation of the compound of the formula (I):

3.26 g (29 mmol) of 1-octene, 34.70 g (165 mmol) of 1,2,2,6,6-pentamethyl-4-allyloxypiperidine prepared in (A) and 3.4 µl of an isopropyl alcohol solution of a platinum catalyst (catalyst designated "KARSTED"), containing about 8.7% by weight of Pt metal, were charged to a 250 cm³ three-necked glass flask fitted with a central stirrer, a thermometer sheath, inlet means including a syringe piston and a condenser blanketed with nitrogen.

By means of the syringe piston, 8.0 g of hydrogenosiloxane oil of formula (II):

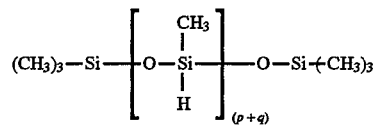

having a content of 1609.25 milliequivalents of ≡Si—H function per 100 g (volumetric determination on a solution titrated with potassium hydroxide in butanol) were injected over the course of 1 hour, 30 minutes into the above mixture maintained at 100° C.

An additional 3×0.7 µl of "KARSTED" catalyst, introduced over the course of the reaction, were injected and the mixture was permitted to react at 100° C. while monitoring the disappearance of the ≡Si—H functions; this disappearance was complete after 7 hours, 30 minutes of reaction.

The reaction mixture was then heated to 100° C. under a pressure of 226 Pa for 2 hours, 20 minutes in order to eliminate volatile products.

This gave 34.0 g of a clear, highly mobile and colorless oil, whose content of piperidyl functional groups was 346 milliequivalents/100 g.

NMR analysis confirmed the expected structure.

| Average statistical formula: |
| --- |
| formula (I) with p = 8.9 |
| q = 54.5. |

EXAMPLE 4

Preparation of a compound of the formula (I), in which:

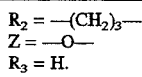
$R_2 = -(CH_2)_3-$
$Z = -O-$
$R_3 = H.$ 2,2,6,6-tetramethyl-4-allyloxypiperidine was prepared according to the procedure described in Example 3 (A). From this compound and using the operating procedure and the reagents described in Example 3(B), a compound of the formula (I), similar to that of Example 3(B) but with $R_3$=H, was prepared.

This gave a clear colorless, highly mobile oil containing 270 milliequivalents of piperidyl functional groups (chemical determination of the —NH— groups). Its structure was confirmed by NMR.

EXAMPLE 5

Preparation of a compound of the formula (I), in which:

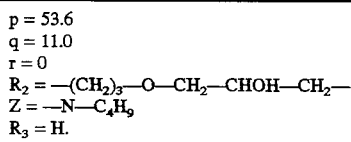
p = 53.6
q = 11.0
r = 0
$R_2 = -(CH_2)_3-O-CH_2-CHOH-CH_2-$
$Z = -N-C_4H_9$
$R_3 = H.$ (A) preparation of the intermediate compound of the formula (VI):

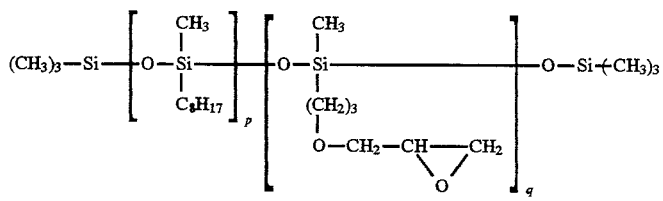

61.0 g (543 mmol) of 1-octene, 13.7 g (122 mmol) of allylglycidyl ether and 13.25 µl of a hexane solution of a platinum catalyst (catalyst designated "KARSTED"), containing about 8.7% by weight of Pt metal were charged to a 250 cm³ three-necked glass flask fitted with a central stirrer, a thermometer sheath, inlet means including a syringe piston and a condenser under nitrogen blanketing.

By means of the syringe piston, 30.0 g of a hydrogenosiloxane oil of formula (II):

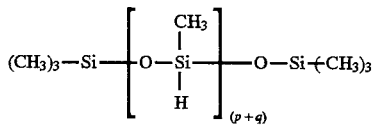

having a content of 1609.25 milliequivalents of ≡Si—H function per 100 g (volumetric determination on a solution titrated with potassium hydroxide in butanol) were injected over the course of 1 hour, 30 minutes into the above mixture maintained at 100° C.

An additional 2.65 µl of the "KARSTED" catalyst were then injected and the mixture was permitted to react at 100° C. while monitoring the disappearance of the ≡Si—H function; this disappearance was complete after 6 hours, 30 minutes of reaction.

The reaction mixture was then heated to 100° C. under a pressure of 266 Pa for 2 hours, 30 minutes, in order to eliminate volatile products.

This gave 77.8 g of a turbid, highly mobile and light-yellow colored oil.

NMR analysis confirmed the expected structure.

| Average statistical formula: |
|---|
| formula (I) with p = 53.6 |
| q = 11.0 |
| r = 0 |

(with a content of 97.39 milliequivalents of epoxide function per 100 g).

(B) preparation of the compound of the formula (I):

12.91 g (60.8 mmol) of 2,2,6,6-tetramethyl-4-n-butylaminopiperidine were charged to a 50 cm³ three-necked glass flask fitted with a central stirrer, a thermometer sheath, inlet means including a syringe piston and a condenser under nitrogen blanketing.

By means of the syringe piston, 15.0 g of the polysiloxane compound of the formula (VI) prepared in (A) were injected over the course of 30 minutes into the above compound maintained at 120° C.

The mixture was permitted to react at 120° to 125° C. while monitoring the disappearance of the epoxide functions (characteristic IR band at 910 cm⁻¹); this disappearance was complete after 23 hours of reaction.

The reaction mixture was then heated to 135° C. under a pressure of 26 Pa for 2 hours in order to eliminate volatile products.

This gave 18.3 g of a clear, brown and homogeneous oil. NMR analysis confirmed the expected structure.

| Average statistical formula: |
|---|
| formula (I) with p = 53.6 |
| q = 11.0 |
| r = 0. |

EXAMPLE 6

Preparation of a compound of the formula (I), in which:

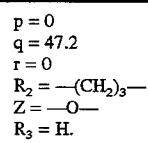
p = 0
q = 47.2
r = 0
$R_2 = -(CH_2)_3-$
$Z = -O-$
$R_3 = H.$ (A) preparation of 4-hydroxy-1,2,2,6,6-pentamethylpiperidine:

314 g (2 mol) of 4-hydroxy-2,2,6,6-tetramethylpiperidine were charged to a 2,000 cm³ four-necked glass flask fitted with a central stirrer, a thermometer sheath, a condenser under nitrogen blanketing and a dropping funnel, stirring slowly under a nitrogen atmosphere. The charge was cooled to 18° to 20° C.

276 g (6 mol) of formic acid were then added over the course of 1 hour while maintaining the temperature below 20° C., and the mixture was then maintained for 1 hour, 30 minutes under stirring.

Finally, 422 cm³ (5.2 mol) of a 37% weight for volume aqueous solution of formaldehyde were added at ambient temperature over the course of 45 minutes and the mixture was maintained under stirring until a homogeneous medium was obtained (1 hour).

Stirring of the reaction mixture was continued for 7 hours at 78° C.

The pH of the reaction mixture was adjusted to 11.9, after cooling to 20° C., by means of a 38% aqueous potassium hydroxide solution.

The 4-hydroxy-1,2,2,6,6-pentamethylpiperidine precipitated; it was dissolved and extracted by means of ethyl ether; the ether solution was dried over anhydrous sodium sulfate, filtered and concentrated in a rotary evaporator.

A solid fraction was thus obtained which was crushed into coarse pieces and finally dried under a reduced pressure at ambient temperature.

This gave 299.6 g (87% yield) of pure 4-hydroxy-1,2,2,6,6-pentamethylpiperidine:

(i) Melting point: 72° C.
(ii) Structure confirmed by proton NMR
(iii) Purity confirmed by vapor phase chromatography.

(B) Preparation of 2,2,6,6-tetramethyl-4-allyloxypiperidine:

186 g (1.185 mol) of 4-hydroxy-2,2,6,6-tetramethylpiperidine, 285.3 g (3.730 mol) of allyl chloride, 93 g (2.325 mol) of powdered sodium hydroxide and 1.93 g (6.09×10⁻³ mol) of tetrabutylammonium bromide were charged to a 1,000 cm³ three-necked glass flask fitted with a central stirrer, a thermometer sheath, a condenser under nitrogen blanketing and a dropping funnel.

The mixture was vigorously stirred and heated under reflux for 8 hours (50° C.).

The reaction mixture was cooled, 400 cm³ of water were added and the mixture was separated into 2 phases.

The aqueous phase was extracted with 100 cm³ of toluene and the 2 organic phases were recombined into a single phase, to which 200 cm³ of toluene were again added.

This organic phase was washed twice with water, dried over sodium sulfate and filtered.

It was concentrated in a rotary evaporator at 45° C. under 650 Pa.

In this manner, 231 g of a crude organic mass were obtained which was purified by fractional distillation.

This gave 189 g (80% yield) of pure 2,2,6,6-tetramethyl-4-allyloxypiperidine:

(i) Boiling point: 51° C. under 80 Pa
(ii) Structure confirmed by proton NMR
(iii) Purity confirmed by vapor phase chromatography.

(C) Preparation of 1,2,2,6,6-pentamethyl-4-allyloxypiperidine:

The procedure was as described in Example 6 (B), but with the following charges: 171 g (1 mol) of 4-hydroxy-1,2,2,6,6-pentamethylpiperidine obtained in Example 6 (A), 255.5 g (3.34 mol) of allyl chloride, 78.5 g (1.962 mol) of powdered sodium hydroxide and 1.67 g (5.2×10⁻³ mol) of tetrabutylammonium bromide.

This gave 275 g of a crude organic mass which was purified by fractional distillation.

This gave 200 g (94% yield) of pure 1,2,2,6,6-pentamethyl-4-allyloxypiperidine:

(i) Boiling point: 88° C. under 130 Pa
(ii) Structure confirmed by proton NMR
(iii) Purity confirmed by vapor phase chromatography.

(D) Preparation of the compound of the Formula (I):

31.19 g (158.1 mmol) of 2,2,6,6-tetramethyl-4-allyloxypiperidine prepared in (B) and 2.7 µl of a hexane solution of a platinum catalyst (catalyst designated "KARSTED"), containing about 9.05% by weight of Pt metal, were charged to a 100 cm³ four-necked glass flask fitted with a central stirrer, a thermometer sheath, inlet means including a syringe piston and a condenser under nitrogen blanketing.

By means of the syringe piston, 8 g of a hydrogenosiloxane oil of the formula (II):

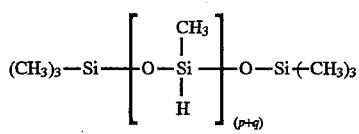

having a content of 1581.33 milliequivalents of ≡Si—H function per 100 g (volumetric determination on a solution titrated with potassium hydroxide in butanol) were injected over the course of 15 minutes into the above mixture maintained at 100° C.

2.7 µl of "KARSTED" catalyst were injected and then an additional 2.7 µl of "KARSTED" catalyst 1 hour later and, finally, 2.7 µl of "KARSTED" catalyst after one further hour, and the mixture was permitted to react at 100° C. while monitoring the disappearance of the ≡Si—H functions; this disappearance was complete after 12 hours of reaction.

The reaction mixture was then heated to 100° C. under a pressure of 40 Pa for 3 hours in order to eliminate volatile products.

This gave 30 g of a clear, highly viscous and light-ochre colored oil, whose content of piperidyl functional groups was 383 milliequivalents/100 g.

NMR analysis confirmed the expected structure.

EXAMPLE 7

Preparation of a compound of the formula (I), in which:

p = 24
q = 16
r = 0
$R_2$ = —(CH$_2$)$_3$—
Z = —O—
$R_3$ = H
$R_1$ = $C_8H_{17}$.

12.80 g (65 mmol) of 2,2,6,6-tetramethyl-4-allyloxypiperidine prepared in Example 6 (B), 10.88 g (97 mmol) of 1-octene and 2.7 µl of a hexane solution of a platinum catalyst (catalyst designated "KARSTED"), containing about 9.05% by weight of Pt metal, were charged to a 100 cm³ four-necked glass flask fitted with a central stirrer, a thermometer sheath, inlet means including a syringe piston and a condenser under nitrogen blanketing.

By means of the syringe piston, 8 g of a hydrogenosiloxane oil of the formula (II) having a content of 1609.25 milliequivalents of ≡Si—H function per 100 g (volumetric determination on a solution titrated with potassium hydroxide in butanol) were injected over the course of 1 hour, 30 minutes into the above mixture maintained at 100° C.

An additional 0.7 µl of "KARSTED" catalyst was injected and the mixture was permitted to react at 100° C. while monitoring the disappearance of the ≡Si—H functions; this disappearance was complete after 7 hours of reaction.

The reaction mixture was then heated to 125° to 130° C. under a pressure of 100 Pa for 2 hours in order to eliminate volatile products.

This gave 25 g of a clear, light-yellow colored oil of low viscosity, whose content of piperidyl functional groups was 192.5 milliequivalents/100 g.

NMR analysis confirmed the expected structure.

EXAMPLE 8

Preparation of a compound of the formula (I), in which:

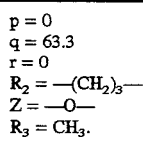

33.97 g (161 mmol) of 1,2,2,6,6-pentamethyl-4-allyloxypiperidine prepared in Example 6 (C) and 2.7 µl of a hexane solution of a platinum catalyst (catalyst designated "KARSTED"), containing about 9.05% by weight of Pt metal, were charged to a 100 cm³ four-necked glass flask fitted with a central stirrer, a thermometer sheath, inlet means including a syringe piston and a condenser under nitrogen blanketing.

By means of the syringe piston, 8 g of a hydrogenosiloxane oil of the formula (II) having a content of 1609.25 milliequivalents of ≡Si—H function per 100 g (volumetric determination on a solution titrated with potassium hydroxide in butanol) were injected over the course of 1 hour, 30 minutes into the above mixture maintained at 100° C.

An additional 0.7 µl of "KARSTED" catalyst was injected and the mixture was permitted to react at 100° C. while monitoring the disappearance of the ≡Si—H functions; this disappearance was complete after 9 hours of reaction.

The reaction mixture was then heated to 125° to 130° C. under a pressure of 70 Pa for 2 hours in order to eliminate volatile products.

This gave 33 g of a clear, very viscous and light-yellow colored oil, whose content of piperidyl functional groups was 364 milliequivalents/100 g.

NMR analysis confirmed the expected structure.

EXAMPLE 9

Preparation of a compound of the formula (I), in which:

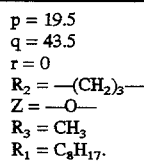

23.82 g (113 mmol) of 1,2,2,6,6-pentamethyl-4-allyloxylpiperidine prepared in Example 6 (C), 5.43 g (48.5 mmol) of 1-octent and 2.3 µl of a hexane solution of a platinum catalyst (catalyst designated "KARSTED"), containing about 9.05% by weight of Pt metal, were charged to a 100 cm³ four-necked glass flask fitted with a central stirrer, a thermometer sheath, inlet means including a syringe piston and a condenser under nitrogen blanketing.

By means of the syringe piston, 8 g of a hydrogenosiloxane oil of the formula (II) having a content of 1609.25 milliequivalents of ≡Si—H function per 100 g (volumetric determination of a solution titrated with potassium hydroxide in butanol) were injected over the course of 1 hour into the above mixture maintained at 100° C.

The mixture was permitted to react for 1 hour at 100° C., an additional 0.7 µl of "KARSTED" catalyst was then injected and the reaction was continued at 100° C. while monitoring the disappearance of the ≡Si—H functions; this disappearance was complete after 12 hours of reaction.

The reaction mixture was then heated to 125° to 130° C. under a pressure of 120 Pa for 2 hours in order to eliminate volatile products.

This gave 30.2 g of a clear, highly viscous and light-yellow colored oil whose content of piperidyl functional groups was 282 milliequivalents/100 g.

NMR analysis confirmed the expected structure.

EXAMPLE 10

Light-stabilization of polypropylene:

The following 3 powder compositions A, B and C were prepared in a slow mixer:

|  | A | B | C |
|---|---|---|---|
| HIMONT PROFAX 6501 polypropylene | 100 g | 100 g | 100 g |
| Methylene-2,2-bis-(4-methyl-6-tert.-butylphenyl) terephthalate | 0.1 g | 0.1 g | 0.1 g |
| Compound of the formula (I) prepared in Example 1 (B) | 0 g | 0.15 g | 0.30 g |

These 3 compositions were kneaded in a LESCUYER. roll mill at 180° C., and the sheets obtained were pressed at 190° C. in a platen press to provide 200 µm thick films.

These films were exposed in an accelerated aging chamber fitted with a fluorescent tube emitting irradiation between 290 and 400 nm with a maximum at about 360 nm, marketed by OSRAM under the reference L 40 W 70. The stability of the energy flux over time was controlled throughout the test. The temperature of the chamber was 35° C.

The aging of the films was followed by infrared spectrometry: the optical density of the carbonyl band at 1720–1740 cm⁻¹ indicated the degree of photooxidation of the polymeric material.

The results obtained are reported in the Table I which follows:

TABLE I

| | Optical density of the compositions | | |
|---|---|---|---|
| Duration of aging | A | B | C |
| 300 hours | 0.15 | 0.10 | 0.10 |
| 400 hours | 0.72 | 0.12 | 0.15 |
| 600 hours | 1.00 (sample broken) | 0.12 | 0.15 |
| 1,200 hours | — | 0.15 | 0.18 |
| 1,800 hours | — | 0.15 | 0.38 |

Comparison of the change in composition A (control) with compositions B and C (according to the invention) evidences the light-stabilizing efficacy of the products of the invention.

EXAMPLE 11

Light-stabilization of linear low-density polyethylene (LLDPE):

Following the procedure of Example 10, the photochemical stability of the following compositions D, E and F was compared:

In a slow mixer, about 300 g of each of the mixtures, whose composition by weight is indicated in the following Table III, were prepared:

TABLE III

| Composition | G | H | I | J | K | L | M | N | O | P |
|---|---|---|---|---|---|---|---|---|---|---|
| PP | 100 | 100 | 100 | 100 | 100 | 100 | 100 | 100 | 100 | 100 |
| Phenolic antioxidant* | 0.02 | 0.02 | 0.02 | 0.02 | 0.02 | 0.02 | 0.02 | 0.02 | 0.02 | 0.02 |
| Commercial anti-UV** | 0 | 0.15 | 0 | 0 | 0 | 0.30 | 0 | 0 | 0 | 0 |
| Compound from Example 3 (B) | 0 | 0 | 0.15 | 0 | 0 | 0 | 0.30 | 0 | 0 | 0.50 |
| Compound from Example 3 (C) | 0 | 0 | 0 | 0.15 | 0 | 0 | 0 | 0.30 | 0 | 0 |
| Compound from Example 4 | 0 | 0 | 0 | 0 | 0.15 | 0 | 0 | 0 | 0.30 | 0 |

*Pentaerythritol tetra-3-(4-hydroxy-3,5-di-tert.-butylphenyl)-propionate
**CHIMASSORB 944:

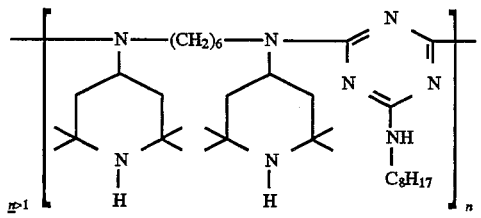

|  | D | E | F |
|---|---|---|---|
| LLDPE (NATENE LL 101 AP) | 100 g | 100 g | 100 g |
| Methylene-2,2-bis-(4-methyl-6-tert.-butylphenyl) terephthalate | 0.05 g | 0.05 g | 0.05 g |
| Compound of the formula (I) prepared in Example 1 (B) | 0 g | 0.15 g | 0.30 g |

The results obtained are reported in the Table II which follows:

TABLE II

| | Optical density of the compositions | | |
|---|---|---|---|
| Duration of aging | D | E | F |
| 300 hours | 0.12 | 0.15 | 0.03 |
| 400 hours | 0.50 | 0.07 | 0.03 |
| 600 hours | 0.77 | 0.08 | 0.03 |
| 900 hours | 1.00 (sample broken) | 0.09 | 0.04 |
| 1,200 hours | — | 0.10 | 0.07 |
| 1,800 hours | — | 0.12 | 0.07 |

Comparison of the change in composition D (control) with compositions E and F (according to the invention) evidences the light-stabilizing efficacy of the products of the invention.

EXAMPLE 12

Light-stabilization of APPRYL 3030 P polypropylene (PP) (marketed by BP Chimie):

These compositions were extruded under the following conditions:

| THORET extruder: | screw diameter = 20 mm |
|---|---|
| | screw length = 400 mm |
| Temperature profile: | |
| zone 1 = 200° C. | |
| zone 2 = 220° C. | |
| zone 3 = 220° C. | |
| zone 4 = 230° C. | |
| nozzle head = 215° C. | |

The granules obtained were pressed into 200 μm films by means of a CARVER press under the following conditions:
Temperature=210° C.
Duration=5 minutes
Pressure=20 MPa.

These films were exposed in a SAIREM-SEPAP 12-24 type accelerated aging chamber. In this chamber, the samples were arranged on a cylindrical turret driven in circular rotational movement. The turret itself was situated in the center of a parallelepipedic chamber, the four corners of which were occupied by a "medium-pressure" mercury vapor lamp of type MAZDA MA 400 W.

The envelope cover of the lamp allowed only radiation of a wavelength greater than 300 nm to pass (such a device is described in French Patent 2,430,609).

The temperature of the chamber was maintained at 60° C. by a regulation system.

The aging of the films was monitored by infrared spectrometry: the optical density of the carbonyl band at 1720–1740 $cm^{-1}$ indicated the degree of photooxidation of the polymeric material. The results obtained are reported in Table IV which follows:

TABLE IV

| Time in hours | OPTICAL DENSITIES | | | | | | | | | |
|---|---|---|---|---|---|---|---|---|---|---|
| | G | H | I | J | K | L | M | N | O | P |
| 0 | <0.05 | <0.05 | <0.05 | <0.05 | <0.05 | <0.05 | <0.05 | <0.05 | <0.05 | <0.05 |
| 41 | 0.301 broken | <0.05 | <0.05 | <0.05 | <0.05 | <0.05 | <0.05 | <0.05 | <0.05 | <0.05 |
| 83 | | <0.05 | <0.05 | <0.05 | <0.05 | <0.05 | <0.05 | <0.05 | <0.05 | <0.05 |
| 152 | | 0.088 | <0.05 | <0.05 | <0.05 | <0.05 | <0.05 | <0.05 | <0.05 | <0.05 |
| 196 | | 0.191 | 0.103 | <0.05 | 0.07 | <0.05 | <0.05 | <0.05 | <0.05 | <0.05 |
| 240 | | 0.330 | 0.168 | 0.106 | 0.204 | <0.05 | <0.05 | <0.05 | <0.05 | <0.05 |
| 254 | | 0.529 | 0.254 | 0.119 | 0.293 | <0.05 | <0.05 | <0.05 | <0.05 | <0.05 |
| 286 | | 0.669 broken | 0.340 | 0.143 | 0.337 | 0.07 | 0.066 | <0.05 | <0.05 | <0.05 |
| 306 | | | 0.482 | 0.181 | 0.576 | 0.106 | 0.082 | <0.05 | <0.05 | <0.05 |
| 336 | | | | 0.312 | | 0.184 | 0.101 | 0.07 | 0.08 | <0.05 |
| 336 | | | | 0.533 | | 0.272 | 0.145 | 0.07 | 0.099 | <0.05 |
| 396 | | | | 0.706 | | 0.409 | 0.218 | 0.07 | 0.128 | 0.062 |
| 426 | | | | 0.745 | | 0.662 | 0.358 | 0.099 | 0.187 | 0.07 |
| 456 | | | | | | | 0.465 | 0.102 | 0.316 | 0.071 |
| 486 | | | | | | | | 0.182 | 0.469 | 0.074 |
| 516 | | | | | | | | 0.254 | 0.662 | 0.086 |
| 546 | | | | | | | | 0.323 | | 0.098 |
| 576 | | | | | | | | 0.398 | | 0.104 |
| 606 | | | | | | | | 0.564 | | 0.132 |
| 636 | | | | | | | | 0.591 | | 0.139 |
| 666 | | | | | | | | | | 0.148 |
| 696 | | | | | | | | | | 0.200 |
| 726 | | | | | | | | | | 0.262 |
| 756 | | | | | | | | | | 0.281 |
| 786 | | | | | | | | | | 0.351 |
| 816 | | | | | | | | | | broken |

After 306 hours of aging, only the samples N, O and P prepared with products of the invention were still unchanged.

The samples M, N, O and P prepared with the compounds of the invention showed the longest durations of aging before they reached optical densities greater than 0.3.

At the same amount by weight (which corresponds to a greater amount in milliequivalents of piperidyl functional groups), the polymeric commercial anti-UV showed a light-stabilizing efficacy which was inferior to that of the products of the invention.

EXAMPLE 13

Light-stabilization of polypropylene:

In a slow mixer, the following 4 powder compositions Q, R, S and T were prepared:

TABLE V

| COMPOSITIONS | Q | R | S | T |
|---|---|---|---|---|
| HIMONT PROFAX 6501 polypropylene | 100 g | 100 g | 100 g | 100 g |
| 2,2-Methylene-bis-(4-methyl-6-tert.-butylphenyl)terephthalate | 0.1 g | 0.1 g | 0.1 g | 0.1 g |
| Anti-UV CHIMASSORB 944 | 0 | 0.5 meq* | 0 | 0 |
| Anti-UV TINUVIN 622** | 0 | 0 | 0.5 meq* | 0 |

TABLE V-continued

| COMPOSITIONS | Q | R | S | T |
|---|---|---|---|---|
| Compound of the formula (I) prepared in Example 1 (B) | 0 | 0 | 0 | 0.5 meq* |

*meq = milliequivalents of 2,2,6,6-tetramethylpiperidyl functional groups
**commercial anti-UV of the formula:

$$H \left[ O \text{-} \underset{p1}{\bigcirc} \text{-} N(CH_2)_2 \text{-} O \text{-} CO(CH_2)_2 \text{-} CO \right]_n O \text{-} CH_3$$

These 4 compositions were kneaded in a LESCUYER roll mill at 180° C., and the sheets obtained were pressed at 210° C. in a platen press to provide 200 μm thick films.

These films were exposed under a dry atmosphere in an accelerated aging chamber fitted with a fluorescent tube emitting irradiation between 290 and 400 nm with a maximum at about 360 nm, marketed by OSRAM under the reference L 40 W 70. The stability of the energy flux over time was controlled throughout the test. The temperature of the chamber was 35° C.

The aging of the films was monitored by infrared spectrometry: the optical density of the carbonyl band at 1720–1740 $cm^{-1}$ indicated the degree of photooxidation of the polymeric material.

The following results are reported in Table VI which follows:

TABLE VI

| Duration of aging | Optical density of the composition | | | |
|---|---|---|---|---|
| | Q | R | S | T |
| 0 hours | 0.07 | 0.02 | 0.11 | 0.09 |
| 280 hours | 0.15 | 0.02 | 0.11 | 0.12 |
| 400 hours | 0.72 | 0.02 | 0.11 | 0.13 |
| 600 hours | 1.00* | 0.02 | 0.11 | 0.13 |
| 1,000 hours | >1.00 | 0.02 | 0.11 | 0.14 |
| 1,360 hours | >1.00 | 0.23 | 0.12 | 0.15 |
| 1,500 hours | >1.00 | 0.49 | 0.13 | 0.15 |
| 2,000 hours | >1.00 | 0.60 | 0.25 | 0.15 |

*sample broken

Comparison of the change in compositions Q (control), S and R (stabilized with very widely used commerical polymeric anti-UVs) with composition T (according to the invention) evidences the greater effectiveness of the products of the invention at an equivalent content of 2,2,6,6-tetramethylpiperidyl functional groups.

EXAMPLE 14

Light-stabilization of linear low-density polyethylene (LLDPE):

In a slow mixer, the following 4 powder compositions U, V, W and X were prepared:

TABLE VII

| COMPOSITIONS | U | V | W | X |
|---|---|---|---|---|
| INOVEX LL0209 AP LLDPE (from BP) | 100 g | 100 g | 100 g | 100 g |
| 2,2-Methylene-bis-(4-methyl-6-tert.-butylphenyl) terephthalate | 0.1 g | 0.1 g | 0.1 g | 0.1 g |
| Anti-UV CHIMASSORB 944 | 0 | 0.5 meq* | 0 | 0 |
| Anti-UV TINUVIN 622 | 0 | 0 | 0.5 meq* | 0 |
| Compound of the formula (I) prepared in Example 1 (B) | 0 | 0 | 0 | 0.5 meq* |

*meq = milliequivalents of 2,2,6,6-tetramethylpiperidyl functional groups

These 4 compositions were kneaded in a LESCUYER roll mill at 120° C., and the sheets obtained were pressed at 210° C. in a platen press to provide 200 μm thick films.

These films were exposed under a dry atmosphere in an accelerated aging chamber fitted with a fluorescent tube to irradiation between 290 and 400 nm with a maximum at about, 360 nm, marketed by OSRAM under the reference L 40 W 70. The stability of the energy flux over time was controlled throughout the test. The temperature of the chamber was 35° C.

The aging of the films was monitored by infrared spectrometry: the optical density of the carbonyl band at 1720–1740 $cm^{-1}$ indicated the degree of photooxidation of the polymeric material.

The results obtained are reported in Table VIII which follows:

TABLE VIII

| Duration of aging | Optical density of the compositions | | | |
|---|---|---|---|---|
| | U | V | W | X |
| 0 hours | 0.02 | 0.02 | 0.16 | 0.03 |
| 280 hours | 0.12 | 0.05 | 0.16 | 0.03 |
| 400 hours | 0.50 | 0.06 | 0.17 | 0.03 |
| 600 hours | 0.77 | 0.06 | 0.17 | 0.03 |
| 1,000 hours | 1.00* | 0.08 | 0.16 | 0.05 |
| 1,360 hours | >1.00 | 0.10 | 0.15 | 0.07 |
| 1,500 hours | >1.00 | 0.10 | 0.16 | 0.07 |
| 2,000 hours | >1.00 | 0.30 | 0.25 | 0.08 |

*sample broken

Comparison of the change in compositions U (control), V and W (stabilized with very widely used commercial polymeric anti-UVs) with composition X (according to the invention) evidences the greater effectiveness of the products of the invention at an equivalent content of 2,2,6,6-tetramethylpiperidyl functional groups.

EXAMPLE 15

Light-stabilization of polypropylene:

In a slow mixer, the following 4 powder compositions YA, YB, YC and YD were prepared:

TABLE IX

| COMPOSITIONS | YA | YB | YC | YD |
|---|---|---|---|---|
| NESTE VD 2001 polypropylene | 100 g | 100 g | 100 g | 100 g |
| IRGANOX 1076** antioxidant | 0.1 g | 0.1 g | 0.1 g | 0.1 g |
| Anti-UV CHIMASSORB 944 | 0 | 0.5 meq* | 0 | 0 |
| Compound of the formula (I) prepared in Example 2 | 0 | 0 | 0.5 meq* | 0 |
| Compound of the formula (I) prepared in Example 2 (B) | 0 | 0 | 0 | 0.5 meq* |

*meq = milliequivalents of 2,2,6,6-tetramethylpiperidyl functional groups
**octadecyl 3-(3,5-di-tert.-butyl-4-hydroxyphenyl)-propionate These 4 compositions were kneaded in a LESCUYER roll mill at 180° C., and the sheets obtained were pressed at 210° C. in a platen press to provide 200 μm thick films.

These films were exposed under an atmosphere of 50% relative humidity in an accelerated aging chamber fitted with a type B fluorescent tube emitting irradiation between 275 and 400 nm with a maximum at about 312 nm. The stability of the energy flux over time was controlled throughout the test. The temperature of the chamber was 55° C.

The aging of the films was monitored by infrared spectrometry: the optical density of the carbonyl band at 1720–1740 $cm^{-1}$ indicated the degree of photooxidation of the polymeric material.

The results obtained are reported in Table X which follows:

TABLE X

| Duration of aging | Optical density of the compositions | | | |
|---|---|---|---|---|
| | YA | YB | YC | YD |
| 0 hours | 0.03 | 0.07 | 0.03 | 0.06 |
| 24 hours | 0.15 | 0.07 | 0.03 | 0.06 |
| 48 hours | 0.59 | 0.07 | 0.03 | 0.06 |
| 100 hours | 1.00* | 0.07 | 0.04 | 0.07 |
| 150 hours | >1.00 | 0.14 | 0.07 | 0.07 |
| 190 hours | >1.00 | 0.16 | 0.08 | 0.10 |
| 240 hours | >1.00 | 0.30 | 0.08 | 0.12 |
| 320 hours | >1.00 | 1.00* | 0.09 | 0.15 |
| 385 hours | >1.00 | >1.00 | 0.12 | 0.19 |
| 430 hours | >1.00 | >1.00 | 0.35 | 0.42 |

*sample broken

Comparison of the change in compositions YA (control) and YB (stabilized with a very widely used commercial polymeric anti-UV) with compositions YC and YD (according to the invention) evidences the greater effectiveness of the products of the invention at an equivalent content of 2,2,6,6-tetramethylpiperidyl functional groups.

EXAMPLE 16

Light-stabilization of linear low-density polyethylene (LLDPE):

In a slow mixer, the following 4 powder compositions ZA, ZB, ZC and ZD were prepared:

TABLE XI

| COMPOSITIONS | ZA | ZB | ZC | ZD |
|---|---|---|---|---|
| NEST DFDS 8020 LLDPE | 100 g | 100 g | 100 g | 100 g |
| IRGANOX 1076 antioxidant | 0.1 g | 0.1 g | 0.1 g | 0.1 g |
| Anti-UV CHIMASSORB 944 | 0 | 0.5 meq* | 0 | 0 |
| Anti-UV TINUVIN 622 | 0 | 0 | 0.5 meq* | 0 |
| Compound of the formula (I) prepared in Example 3 (B) | 0 | 0 | 0 | 0.5 meq* |

*meq = milliequivalents of 2,2,6,6-tetramethylpiperidyl functional groups

These 4 compositions were headed in a LESCUYER roll mill at 120° C., and the sheets obtained were pressed at 210° C. in a platen press to provide 200 μm thick films.

These films were exposed under an atmosphere of 50% relative humidity in an accelerated aging chamber fitted with a type B fluorescent tube emitting irradiation between 275 and 400 nm with a maximum at about 312 nm. The stability of the energy flux over time was controlled throughout the test. The temperature of the chamber was 55° C.

The aging of the films was monitored by infrared spectrometry: the optical density of the carbonyl band at 1720–1740 cm$^{-1}$ indicated the degree of photooxidation of the polymeric material.

The results obtained are reported in Table XII which follows:

TABLE XII

| Duration of aging | Optical density of the compositions | | | |
|---|---|---|---|---|
| | ZA | ZB | ZC | ZD |
| 0 hours | 0.12 | 0.06 | 0.11 | 0.08 |
| 35 hours | 0.22 | 0.06 | 0.09 | 0.05 |
| 100 hours | 1.00* | 0.05 | 0.07 | 0.03 |
| 190 hours | >1.00 | 0.05 | 0.06 | 0.03 |
| 230 hours | >1.00 | 0.04 | 0.06 | 0.03 |
| 320 hours | >1.00 | 0.05 | 0.05 | 0.03 |
| 450 hours | >1.00 | 0.17 | 0.03 | 0.03 |
| 600 hours | >1.00 | 1.00* | 0.08 | 0.06 |
| 700 hours | >1.00 | >1.00 | 0.17 | 0.13 |
| 800 hours | >1.00 | >1.00 | 1.00* | 0.50 |

*sample broken

Comparison of the change in compositions ZA (control), ZB and ZC (stabilized with very widely used commercial polymeric anti-UVs) with composition ZD (according to the invention) evidences the greater effectiveness of the products of the invention, at an equivalent content of 2,2,6,6-tetramethylpiperidyl functional groups.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising a light/UV-degradable polymer and, as a stabilizer therefor, an effective light/UV-stabilizing amount of at least one compound having the formula (I)

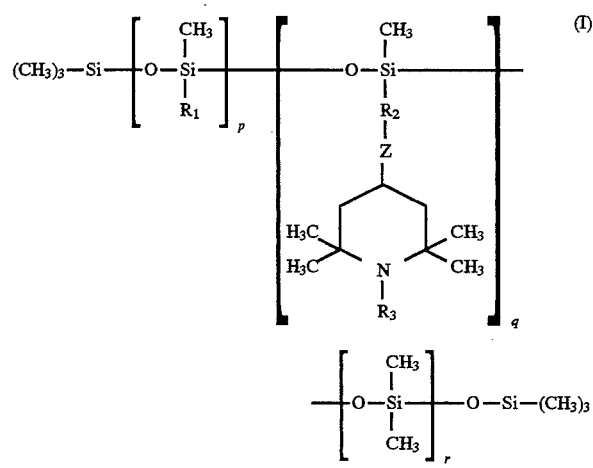

wherein p and r are numbers equal to or grater than 0;

q is a number greater than 0;

the sum p+r+q is greater than or equal to 5;

$R_1$ is a linear or branched chain alkyl radical having more than 4 carbon atoms, —$(CH_2)_n$—COO—$R_4$, wherein n is a number ranging from 5 to 20 and $R_4$ is an alkyl radical having from 1 to 12 carbon atoms, or —$(CH_2)_m$—$OR_5$ wherein m is a number ranging from 3 to 10 and $R_5$ is a hydrogen atom, an ethylene oxide chain, a propylene oxide chain, or an acyl radical having from 2 to 12 carbon atoms; $R_2$ is a linear or branched chain alkylene radical having from 2 to 18 carbon atoms, an alkylene-carbonyl radical, the linear or branched chain alkylene moiety of said alkylene-carbonyl radical having from 2 to 20 carbon atoms, an alkylene-cyclohexylene radical, the linear or branched chain alkylene moiety of said alkylene-cyclohexylene radical having from 2 to 12 carbon atoms and the cyclohexylene moiety containing an —OH group, and optionally one or two alkyl radicals having from 1 to 4 carbon atoms,

—$R_6$—O—$R_7$— wherein $R_6$ and $R_7$, which may be identical or different, are each an alkylene radical having from 1 to 12 carbon atom,

—$R_6$—O—$R_7$— wherein $R_6$ and $R_7$ are as defined above and either or both are substituted by one or two OH groups,

—$R_6$—COO—$R_7$— wherein $R_6$ and $R_7$ are as defined above,

—$R_6$—OCO—$R_7$— wherein $R_6$ and $R_7$ are as defined above, or —$R_6$—O—$R_7$—O—CO—$R_8$— wherein $R_6$, $R_7$ and $R_8$, which may be identical or different, are each an alkylene radical having from 2 to 12 carbon atoms and $R_7$ is substituted by a hydroxyl group, $R_3$ is a hydrogen atom or a linear or branched chain alkyl having from 1 to 12 carbon atoms; and Z is —O— or —$NR_9$— wherein $R_9$ has the definition of $R_3$.

2. The composition of matter as defined by claim 1, said polymer comprising a polyolefin, polyalka-diene, polystyrene, polyurethane, polyamide, polyester, polycarbonate, polysulfone, polyether-sulfone, polyether-ketone, acrylic polymer, or copolymer or mixture thereof.

3. The composition of matter as defined by claim 2, said polymer comprising a polypropylene, high-density polyethylene, linear low-density polyethylene, low-density polyethylene, polybutadiene, or copolymer or mixture thereof.

4. The composition of matter as defined by claim 1, comprising 0.04 to 20 milliequivalents of 2,2,6,6-tetramethylpiperidyl functional groups per 100 g of said polymer.

5. The composition of matter as defined by claim 4, comprising 0.20 to 4 milliequivalents of 2,2,6,6-tetramethylpiperidyl functional groups per 100 g of said polymer.

6. The composition of matter as defined by claim 1, comprising from 0.01% to 5% by weight of said at least one compound of formula (I) based on the weight of said polymer.

7. The composition of matter as defined by claim 1, further comprising at least one additional antioxidant, UV-absorber or light stabilizer, metal deactivator, phosphite or phosphonite, peroxide scavenger, polyamide stabilizer, basic co-stabilizer, nucleating agent, or filler or reinforcing agent.

8. The composition of matter as defined by claim 1, further comprising a plasticizer, lubricant, emulsifier, pigment, optical brightener, flameproofing agent, antistatic agent or blowing agent.

9. A shaped article comprising the composition of matter as defined by claim 1.

* * * * *